Feb. 27, 1968 H. G. GRIMMEISS 3,371,285

CIRCUIT ARRANGEMENT FOR AMPLIFYING ELECTRICAL SIGNALS

Filed March 11, 1964

INVENTOR.
HERMANN G. GRIMMEISS
BY
AGENT

United States Patent Office 3,371,285

Patented Feb. 27, 1968

3,371,285
CIRCUIT ARRANGEMENT FOR AMPLIFYING ELECTRIC SIGNALS

Hermann Georg Grimmeiss, Aachen, Germany, assignor to North American Philips Company, Inc., New York, N.Y., a corporation of Delaware Filed Mar. 11, 1964, Ser. No. 351,163
Claims priority, application Germany, Mar. 14, 1963, N 22,880
5 Claims. (Cl. 330—59)

ABSTRACT OF THE DISCLOSURE

A circuit for converting a D.C. voltage to an A.C. voltage, or for amplifying low frequency or D.C. signals, comprises first and second photosensitive resistors connected in a push-pull arrangement with the signal source and the input circuit of the electrical load. First and second semiconductor p-n recombination radiation elements are optically coupled to the first and second photosensitive resistors, respectively. The first and second p-n radiation elements are connected in parallel across a source of A.C. voltage and with opposite polarities so that they are rendered conductive during alternate half cycles of the A.C. voltage and thereby alternately illuminate the photoresistors to produce a chopper action.

Figure 1:
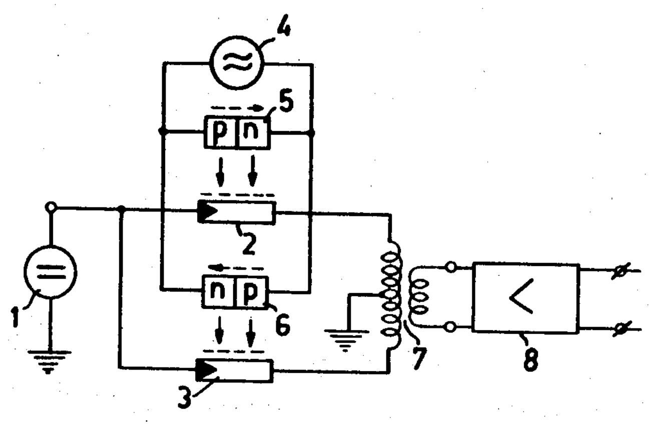

The invention relates to a circuit arrangement for amplifying electric signals by means of an alternating-voltage amplifier, to which the signals are fed via a vibrator.

The arrangement not only relates to the amplification of direct voltages, but also to the amplification of alternating voltages, or broadband signals, the frequency of which is lower than the frequency of the vibrator.

In principle the vibrator may be formed by a photoresistor exposed periodically to a source of light, said resistor being connected between the input terminals of the amplifier and the input electrodes of the active amplifying element in the input stage of the amplifier.

In this case, it is difficult, however, to obtain in a simple manner the correct periodicity by means of conventional A.C. supplied sources of light, for instance incandescent lamps or gas discharge lamps, in accordance with which periodicity the photo-resistor must be exposed.

Use may be made, for example, of two incandescent lamps or gas discharge lamps connected to two different alternating voltage sources having the same frequency, the voltages of which have a phase difference of 90°. Then the lamps will be ignited alternately four times per period of the alternating voltage. However, such alternating voltages are usually not available, so that additional phase-shifting networks are required for deriving from one of the alternating voltages the other alternating voltage having a phase shift of 90° with respect to the first-mentioned voltage.

Moreover, there is the disadvantage that one lamp has not yet extinguished before the other has ignited. The two photoresistors then beome simultaneously conducting so that high currents are produced which bring about an undesirable load on the input signal source.

An object of the invention is to eliminate this problem in an efficaceous manner and is characterized in that two photoresistors included in the two anti-parallel circuits are connected between the source of electric signals and the input electrodes of the active amplifying element in the input stage of the amplifier. In this arrangement, each photoresistor is illuminated by an associated pn-recombination radiation source, connected to an alternating-voltage source so that the radiation sources alternately emit light and the photoresistors become alternately conducting.

It is known that anti-parallel circuits include elements which become conducting in opposite phase directions of the applied alternating voltage.

A p-n recombination radiation source is to denote herein, as usual, a semiconductor body having at least one p-n junction in which the charge carries required for the radiation recombination are obtained by the injection of minority charge carriers into or in the proximity of the p-n junction in the operation of this junction in the forward direction. The wavelength of the produced radiation is then determined by the value of the quantum of energy released in the recombination and this recombination may take place either by a direct transition from the charge band to the valence band or by a transistion via an activator level lying between the energy bands. Consequently, a p-n radiation source luminesces only for one half period of the alternating voltage.

Such a p-n recombination radiation source or the structure thereof with a photo-conducting part on a semiconducting part on a semiconductor crystal are known per se, compare the German Auslegeschrift 1,054,179 and the U.S. patent specification 3,043,959, respectively.

Figure 2:
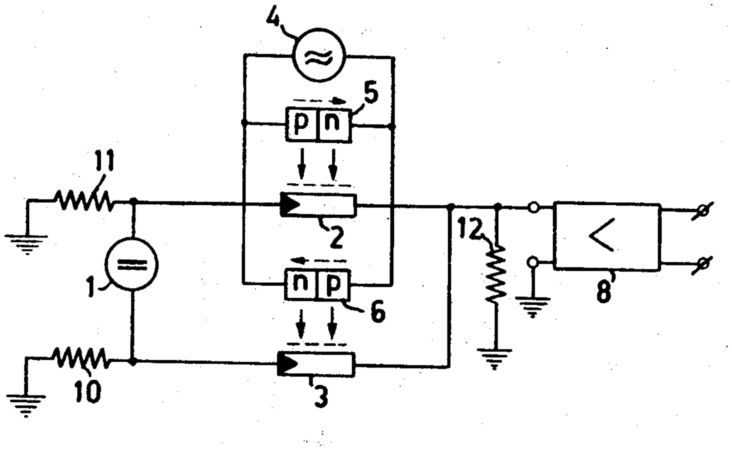

The invention will now be described more fully with reference to the accompanying drawing wherein:

FIG. 1 shows a first embodiment of a circuit arrangement according to the invention and FIG. 2 shows a variant thereof.

As shown in FIG. 1, the signals to be amplified from a source 1 are fed to the two photo-conductors 2 and 3. These photo-conductors are rendered alternately conducting in accordance with the control-sources of light. The dark resistance of a suitable photo-conductor, for example of CdS, CdSe or GaAs may amount to a few hundred Mohms, whereas the conducting resistance of such photo-conductors may be reduced to a few ohms under strong illumination.

The sources of light are fed by an alternating voltage source 4. This alternating voltage source may be formed by the electric house supply. In accordance with the invention, the light sources are formed by two p-n recombination radiation sources consisting, for example, of the compounds GaP or GaAs. The p-n radiation sources 5 and 6 are connected to the voltage source 4 so that they become alternately conducting. Conventional light sources such as incandescent lamps or gas discharge lamps emit light for each half period, i.e. during both the positive half period and the negative half period of the alternating voltage. On the contrary, in accordance with the invention, p-n radiation sources are used which have the property that they emit light only when a current passes in the forward direction through the p-n diode. This direction of current is indicated in the figures by the broken arrow. Since the two diodes 5 and 6 are connected in opposite senses to the source 4, they emit light alternately. Consequently, current either flows through the photo-conductor 2 or through the photo-conductor 3 so that a square-wave alternating voltage is produced across the input winding of the transformer 7, the amplitude of said voltage corresponding to the instantaneous value of the voltage of the source 1. This alternating voltage may furthermore be amplified in an A.C. amplifier 8 and, if desired, rectified.

In a practical embodiment, elements 2 and 3 were CdS photo-resistors of an experimental type. Elements 5 and 6 were p-n radiation sources of GaP of an experimental type.

Direct voltages of a few microvolts from the source 1 could, subsequent to transformation into alternating voltages, be amplified and measured.

The transformer 7 may be omitted if the source 1 is connected as is indicated in FIG. 2. In the arrangement shown in this figure, reference numerals 10, 11 and 12 designate resistors of adequate value. The values of the resistors 10 and 11 are preferably equal and each of them exceeds the resistance value of each photo-resistor in the conducting state.

What is claimed is:

1. An amplifier circuit comprising a source of electric signal, A.C. amplifier means having an input circuit, first and second photosensitive resistors, first means connecting said first photosensitive resistor in series between said signal source and said input circuit, second means connecting said second photosensitive resistor in series between said signal source and said input circuit, and means for rendering said first and second photosensitive resistors alternately conductive, said means comprising a first semiconductor p-n recombination radiation element optically coupled to said first photosensitive resistor, a second semiconductor p-n recombination radiation element optically coupled to said second photosensitive resistor, and means for alternately energizing said first and second radiation element comprising a source of alternating voltage connected to said first and second radiation elements in opposite polarity relationship.

2. A circuit as described in claim 1 wherein said first and second p-n radiation elements are connected in parallel across said A.C. voltage source with opposite polarities.

3. An amplifier circuit comprising a source of electric signal, A.C. amplifier means having an input circuit, first and second photosensitive resistors, a transformer having a center tapped primary winding and a secondary winding, means connecting said secondary winding to said input circuit, means connecting said signal source, said first and second photosensitive resistors and said primary winding in a push-pull circuit, a source of alternating voltage, a first semiconductor p-n recombination radiation element optically coupled to said first photosensitive resistor, a second semiconductor p-n recombination radiation element optically coupled to said second photosensitive resistor, first means connecting said first radiation element to said source of alternating voltage with a given polarity to produce a current flow through said element during one half cycle of said A.C. voltage, and second means connecting said second radiation element to said source of alternating voltage with opposite polarity to produce a current flow through said second radiation element during the opposite half cycle of said A.C. voltage.

4. A D.C.-A.C. converter circuit comprising, a source of D.C. voltage, an electrical load having an input circuit, first and second photosensitive resistors, first means connecting said first photosensitive resistor in series between said D.C. voltage source and said input circuit, second means connecting said second photosensitive resistor in series between said D.C. voltage source and said input circuit, a source of alternating voltage, a first semiconductor p-n recombination radiation element optically coupled only to said first photosensitive resistor, a second semiconductor p-n recombination radiation element optically coupled only to said second photosensitive resistor, and means connecting said first and second radiation elements to said source of alternating voltage in opposite polarity relationship so that said first and second radiation elements are rendered alternately conductive during alternate half cycles of said A.C. voltage thereby to alternately illuminate said first and second photosensitive resistors.

5. A circuit as described in claim 4 wherein said first p-n radiation element is connected across said A.C. voltage source with a given polarity and said second p-n radiation element is connected in parallel with said first radiation element across said A.C. voltage source, but with opposite polarity.

No references cited.

ROY LAKE, *Primary Examiner.*

NATHAN KAUFMAN, *Examiner.*